US010986221B2

(12) United States Patent
Cohen

(10) Patent No.: US 10,986,221 B2
(45) Date of Patent: Apr. 20, 2021

(54) EXECUTION OF TESTING PROCESSES ON APPARATUSES

(71) Applicant: ENTIT SOFTWARE LLC, Sanford, NC (US)

(72) Inventor: Eliel Cohen, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 16/298,378

(22) Filed: Mar. 11, 2019

(65) Prior Publication Data
US 2020/0296196 A1 Sep. 17, 2020

(51) Int. Cl.
| | | |
|---|---|---|
| *G06F 11/22* | (2006.01) | |
| *H04M 1/24* | (2006.01) | |
| *H04M 1/725* | (2021.01) | |
| *H04B 1/3816* | (2015.01) | |

(52) U.S. Cl.
CPC ............ *H04M 1/24* (2013.01); *H04B 1/3816* (2013.01); *H04M 1/72577* (2013.01)

(58) Field of Classification Search
CPC ..... H04W 24/08; H04W 24/02; H04W 24/04; H04W 24/06; H04W 24/00; H04M 3/30; H04M 3/248; H04M 1/24; G06F 11/2284; G06F 11/2289; G06F 11/3051; H04B 1/3816
See application file for complete search history.

(56) References Cited

U.S. PATENT DOCUMENTS

| | | | |
|---|---|---|---|
| 8,832,644 B2 | 9/2014 | Hirsch et al. | |
| 9,980,142 B2 | 5/2018 | Beals | |
| 2006/0121947 A1* | 6/2006 | Lee ................... | H04M 1/72547 455/566 |
| 2009/0019384 A1* | 1/2009 | Chien ................... | G06F 9/4401 715/764 |
| 2010/0015942 A1* | 1/2010 | Huang ................... | H04M 1/66 455/404.1 |
| 2010/0250220 A1* | 9/2010 | Colmenares .......... | G06F 11/261 703/13 |

(Continued)

OTHER PUBLICATIONS

Elva, "Activate iPhone without SIM Card in 5 Ways", Mar. 2, 2018, 6 pages, https://toolbox.iskysoft.com/iphone-tips/activate-iphone-without-sim-card.html.

(Continued)

*Primary Examiner* — Rafael Pérez-Gutiérrez
*Assistant Examiner* — Xiang Zhang

(57) ABSTRACT

According to examples, an apparatus may include a processor and a non-transitory computer readable medium that the processor may execute to initiate a testing process of the apparatus following a boot up of the apparatus, in which a popup message is displayed on the apparatus following the boot up and the popup message blocks performance of the testing process and in which the apparatus is to enter into a lock mode following the popup message being displayed. While the apparatus is in the lock mode, the apparatus may be caused to emerge from the lock mode, in which emergence from the lock mode is to dismiss the popup message from being displayed on the apparatus. In addition, execution of the testing process of the apparatus may be continued following dismissal of the popup message.

20 Claims, 5 Drawing Sheets

(56) References Cited

U.S. PATENT DOCUMENTS

| | | | | |
|---|---|---|---|---|
| 2013/0073344 A1* | 3/2013 | Parent | .................... | G06Q 10/06 |
| | | | | 705/7.39 |
| 2014/0309775 A1* | 10/2014 | Jenkinson | .................. | B25J 9/02 |
| | | | | 700/250 |
| 2015/0096044 A1* | 4/2015 | Zhou | ....................... | G06F 21/84 |
| | | | | 726/26 |
| 2016/0227107 A1* | 8/2016 | Beaumont | ............... | G06F 3/005 |
| 2019/0007826 A1 | 1/2019 | Wane | | |
| 2019/0147454 A1* | 5/2019 | Millington | ........... | G06Q 30/012 |

OTHER PUBLICATIONS

Hewlett Packard Enterprise Development LP. "Connect iOS mobile devices", Mar. 30, 2017, 11 pages. http://mobilecenterhelp.saas.hpe.com/docs/en/2.01/mobilecenter_help/Content/IOS_device_setup.htm.

Daniel,"How to Unlock iPhone without SIM Card", Dec. 27, 2018, 9 pages. https//www.imyfone.com/unlock-iphone/how-to-unlock-iphone-without-sim-card/.

Rica Serenio, "How to Unlock LG Aristo 2 using Unlocking"°, 2008, 14 pages. https://www.unlockunit.com/blog/unlock-lg-aristo-2-using-unlocking-instructions/.

* cited by examiner

300

```
┌─────────────────────────────────────────────────┐
│ DOWNLOAD A SET OF INSTRUCTIONS FOR TESTING AN   │
│        OPERATION OF A MOBILE DEVICE             │
│                      302                        │
└─────────────────────────────────────────────────┘
                         │
                         ▼
┌─────────────────────────────────────────────────┐
│  EXECUTE THE SET OF INSTRUCTIONS TO TEST THE    │
│  OPERATION OF THE MOBILE DEVICE, IN WHICH A POPUP│
│  MESSAGE IS DISPLAYED DURING EXECUTION OF THE SET│
│  OF INSTRUCTIONS AND THE MOBILE DEVICE IS TO ENTER│
│  INTO A LOCK MODE DURING EXECUTING OF THE SET OF │
│                   INSTRUCTIONS                   │
│                      304                         │
└─────────────────────────────────────────────────┘
                         │
                         ▼
┌─────────────────────────────────────────────────┐
│ WHILE THE MOBILE DEVICE IS IN THE LOCK MODE, CAUSE│
│ THE MOBILE DEVICE TO EMERGE FROM THE LOCK MODE,  │
│   IN WHICH EMERGENCE FROM THELOCK MODE           │
│   AUTOMATICALLY CAUSES THE DISPLAYED POPUP       │
│            MESSAGE TO BE DISMISSED               │
│                      306                         │
└─────────────────────────────────────────────────┘
                         │
                         ▼
┌─────────────────────────────────────────────────┐
│  CONTINUE EXECUTION OF THE SET OF INSTRUCTIONS   │
│   TO TEST THE OPERATION OF THE MOBILE DEVICE     │
│   FOLLOWING DISMISSAL OF THE DISPLAYED POPUP     │
│                    MESSAGE                       │
│                      308                         │
└─────────────────────────────────────────────────┘
```

*FIG. 3*

NON-TRANSITORY COMPUTER READABLE MEDIUM
500

DOWNLOAD THE MACHINE READABLE INSTRUCTIONS, THE APPARATUS HAVING A SIM COMPONENT TO WHICH A SIM CARD IS TO BE CONNECTED, A SIM CARD NOT BEING CONNECTED TO THE SIM COMPONENT
502

TEST THE OPERATION OF THE APPARATUS FOLLOWING A BOOT UP OF THE APPARATUS, IN WHICH A POPUP MESSAGE PERTAINING TO THE SIM CARD NOT BEING CONNECTED TO THE SIM COMPONENT IS DISPLAYED FOLLOWING THE BOOT UP OF THE APPARATUS AND THE APPARATUS ENTERS INTO A LOCK MODE FOLLOWING DISPLAY OF THE POPUP MESSAGE
504

WHILE THE APPARATUS IS IN THE LOCK MODE, CAUSE THE APPARATUS TO EMERGE FROM THE LOCK MODE, IN WHICH EMERGENCE FROM THE LOCK MODE CAUSES THE DISPLAYED POPUP MESSAGE TO BE DISMISSED
506

CONTINUE TO TEST THE OPERATION OF THE APPARATUS FOLLOWING DISMISSAL OF THE DISPLAYED POPUP MESSAGE
508

FIG. 5

EXECUTION OF TESTING PROCESSES ON APPARATUSES

BACKGROUND

Mobile devices, such as mobile phones, tablet computers, and the like, are often tested to ensure that the mobile devices are operating properly prior to the mobile devices being delivered to customers or to distributors. In many instances, testing may be performed on both the hardware and the software of the mobile devices. The testing may include monitoring and trouble-shooting of software applications, content, and the like. The testing may also include verification and validation of hardware and software applications loaded on the mobile devices.

BRIEF DESCRIPTION OF THE DRAWINGS

Features of the present disclosure are illustrated by way of example and not limited in the following figure(s), in which like numerals indicate like elements, in which:

FIGS. 3 and 4, respectively, depict example methods for executing a testing process of an apparatus; and FIG. 5 shows a block diagram of a non-transitory computer readable medium that may have stored thereon machine readable instructions for testing an operation of an apparatus.

DETAILED DESCRIPTION

Figure 1:
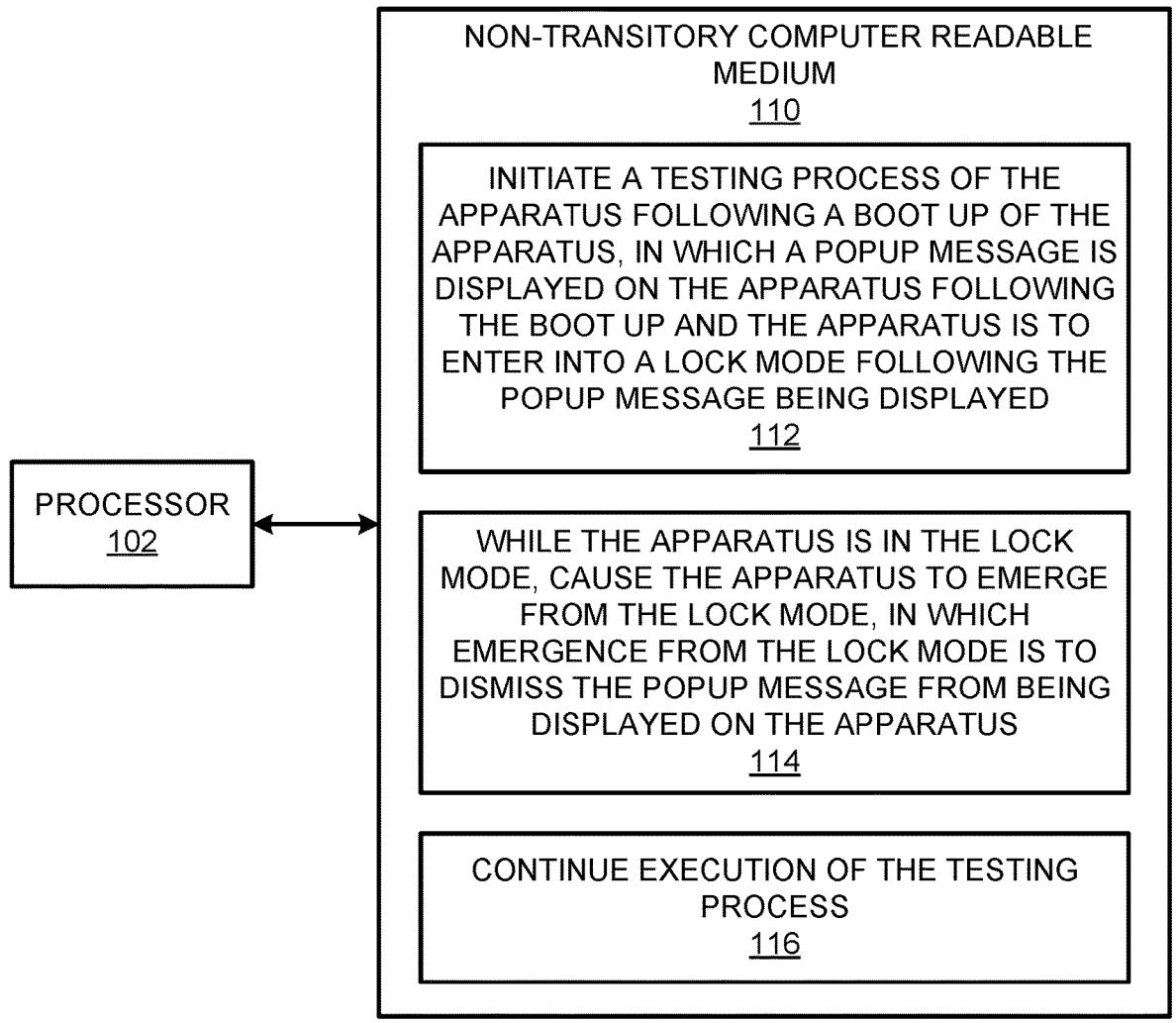
FIG. 1 shows a block diagram of an example apparatus that may execute a testing process of the apparatus.

Generally speaking, in instances in which a mobile device is a cellular-enabled mobile device, such as a mobile phone, a cellular-enabled tablet computer, or the like, the mobile device may be manufactured to include a slot or other feature to receive a subscriber identity module (SIM) card. The SIM card may store data for a cellular telephone subscriber, in which the data may include a user identity, location and phone number, contact lists, network authorization data, personal security keys, etc. As such, an active SIM card may not be installed into the mobile device until the mobile device is delivered to a consumer or a distributor of the mobile device. In addition, following manufacture and prior to delivery of the mobile device to a distributor or a consumer, an operating system as well as other software applications may be installed onto the mobile device.

In addition, prior to delivery of the mobile device to a consumer or a distributor, the mobile device may be tested to determine whether the hardware and/or software are operating properly and/or within desired parameters. In instances in which the mobile device is determined to not be operating properly and/or not within desired parameters, various corrective measures may be applied to the mobile device. In order to test the mobile device, the mobile device may be booted up and a testing application may be loaded onto the mobile device. For instance, the mobile device may be connected to a computing device on which the testing application is stored or through which the testing application is otherwise available and the testing application may be installed and run automatically when the mobile device is connected to the computing device and is booted up. That is, the mobile device may have plug-and-play connectivity with the computing device such that the testing application may be communicated from the computing device, installed on the mobile device, and automatically executed on the mobile device.

In some instances in which the mobile device is booted up without a SIM card installed in the mobile device, a popup message may appear on the display of the mobile device to indicate that a SIM card is missing. That is, the operating system running on the mobile device may cause a popup message indicating that a SIM card is missing, requesting that a SIM card be inserted, or the like, to be displayed. A consequence of this popup message being displayed may be that a testing application currently executing on the mobile device may be disrupted or may otherwise be unable to run. The display of the popup message may thus disrupt the testing by the testing application of the mobile device. In addition, the testing may not be continued until the popup message is cleared (which is also recited herein as being dismissed). Some types of operating systems may cause the popup message to automatically be cleared when the mobile device enters into a lock mode (e.g., sleep, hibernate, or the like, mode) and emerges from the lock mode.

Disclosed herein are apparatuses, methods, and computer readable media that may exploit the automatic popup message clearing feature of the mobile device to enable the testing of the apparatus to be continued. That is, for instance, the mobile device may be set to enter into a lock mode after a predetermined length of time following a certain event pertaining to a boot up of the mobile device. The certain event may be the start of the boot up process, the end of the boot up process, or some other event related to the boot up process. In addition, the boot up process may be initiated from a condition in which the mobile device is turned off and/or from a condition in which the mobile device is restarted. The predetermined length of time may be based on the length of time that it normally takes for the popup message to be displayed following boot up process. For instance, the predetermined length of time may be set to expire a short time, e.g., a few seconds, 1 minute, 2 minutes, or the like, after the popup message is normally to be displayed.

Following expiration of the predetermined length of time, and while the mobile device is in the lock mode, the testing application may cause the mobile device to emerge from the lock mode, which may cause the popup message to be cleared (e.g., dismissed) from the mobile device. In addition, the testing application may cause the mobile device to avoid being automatically locked during execution of the testing application. As a result, for instance, the mobile device may remain remotely available during the testing process.

Through implementation of the apparatuses, methods, and computer readable media disclosed herein, a testing process of an apparatus may continue to be executed following boot up of the apparatus and the display of a popup message that may cause the testing process to be interrupted or stopped. That is, for instance, the apparatus may be set to enter into a lock mode and the testing process may cause the apparatus to emerge, e.g., awake, from the lock mode, which may cause the popup message to be dismissed and the testing process to be continued. As a result, a user may not be required to manually dismiss the popup message for the testing process to continue and the testing process may be executed and completed in a relatively swift and efficient manner. Through execution of the testing process in such a manner, the computing resources as well as the power consumed to perform the testing process may also be relatively reduced, e.g., minimized.

Before continuing, it is noted that as used herein, the terms "includes" and "including" mean, but is not limited to, "includes" or "including" and "includes at least" or "including at least." The term "based on" means "based on" and "based at least in part on."

Figure 2:
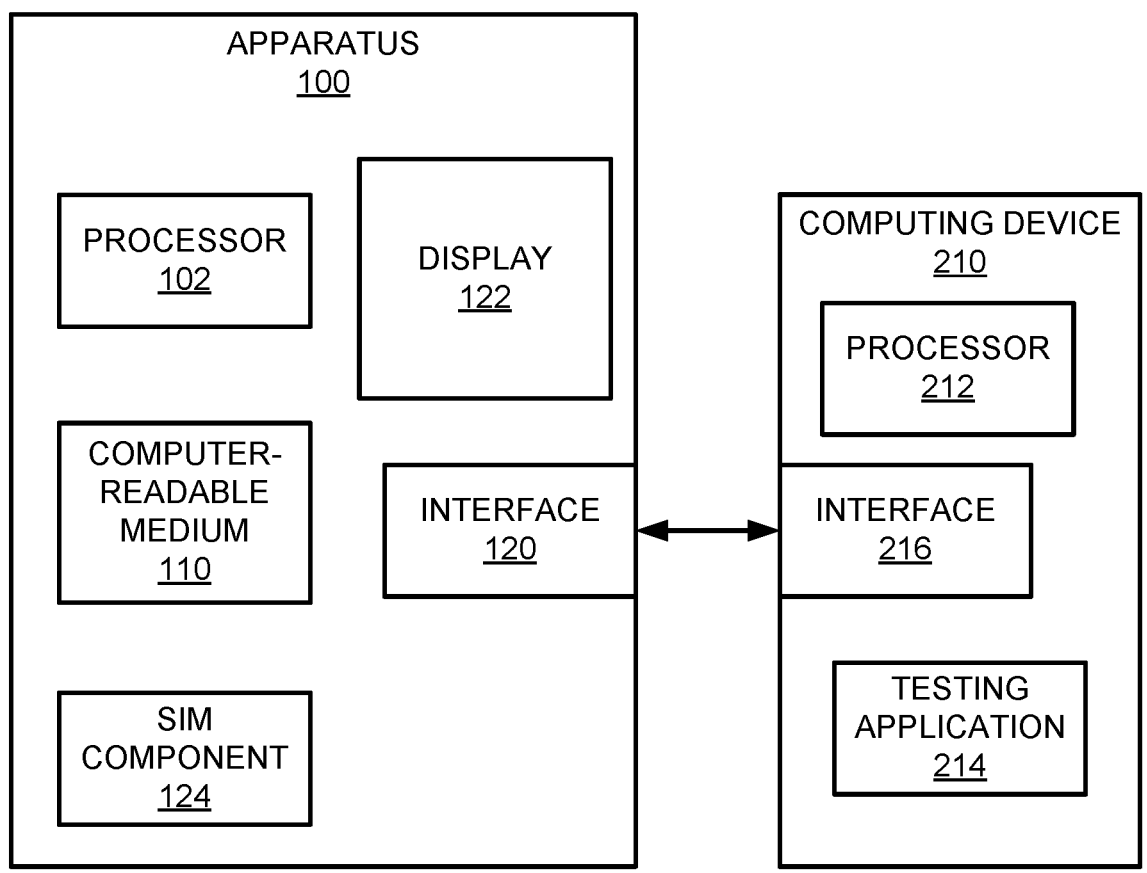
FIG. 2 shows a block diagram of an example testing system that may include the example apparatus depicted in FIG. 1.

Reference is first made to FIGS. 1 and 2. FIG. 1 shows a block diagram of an example apparatus 100 that may execute a testing process of the apparatus 100. FIG. 2 shows a block diagram of an example testing system 200 that may include the example apparatus 100 depicted in FIG. 1 and a computing device 210. It should be understood that the apparatus 100 depicted in FIG. 1 and/or the testing system 200 depicted in FIG. 2 may include additional components and that some of the components described herein may be removed and/or modified without departing from the scopes of the apparatus 100 and/or the testing system 200 disclosed herein.

The apparatus 100 may be a mobile device, e.g., a cellular telephone, a smartphone, a cellular-enabled tablet computer, or the like. The computing device 210 may be a server computer, a desktop computer, a laptop, or the like, which may include instructions to manage execution of a testing process of the apparatus 100. That is, for instance, the computing device 210 may deliver a testing application 214 to the apparatus 100 via an interface 216. The apparatus 100 may execute the testing application 214 to determine whether the hardware and/or software on the apparatus 100 are operating properly and/or within desired parameters. In this regard, the testing application 214 may include a set of instructions that the apparatus 100 may execute to make these determinations. In addition, the computing device 210 may deliver additional testing applications to the apparatus 100 for additional testing to be implemented during a testing operation. In some examples, corrective measures may be taken in instances in which the testing identifies errors or other problems associated with the operation of the apparatus 100.

As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), a graphics processing unit (GPU), and/or other hardware device. The apparatus 100 may also include a non-transitory computer readable medium 110 that may have stored thereon machine readable instructions 112-116 (which may also be termed computer readable instructions) that the processor 102 may execute. The machine readable instructions 112-116 may be the set of instructions of the testing application 214 that the apparatus 100 received from the computing device 210.

The non-transitory computer readable medium 110 may be an electronic, magnetic, optical, or other physical storage device that contains or stores executable instructions. The non-transitory computer readable medium 110 may be, for example, Random Access memory (RAM), an Electrically Erasable Programmable Read-Only Memory (EEPROM), a storage device, an optical disc, and the like. The term "non-transitory" does not encompass transitory propagating signals.

The apparatus 100 may also include an interface 120 through which the apparatus 100 may communicate with the computing device 210. The interface 120 may include hardware and/or software to enable the communications between the apparatus 100 and the computing device 210. In some examples, the apparatus 100 may have plug and play capability such that, for instance, the apparatus 100 may automatically communicate with the computing device 210 following connection of the apparatus 100 to the computing device 210. By way of particular example, the apparatus 100 may automatically receive, e.g., download, a copy of the testing application 214 from the computing device 210 and the processor 102 may automatically cause the testing application 214 to be initiated in response to the apparatus 100 being connected to the computing device 210.

The apparatus 100 may further include a display 122 and a SIM component 124. The SIM component 124 may be a component to which a SIM card may be connected such that the apparatus 100 may read contents of the SIM card. The apparatus 100 may include a slot or other opening into which a SIM card may be inserted to connect the SIM card to the SIM component 124.

The processor 102 may fetch, decode, and execute the instructions 112 to initiate a testing process of the apparatus 100 following a boot up of the apparatus 100. As discussed herein, following a boot up of the apparatus 100, a popup message may be displayed on the display 122. For example, in instances in which a SIM card is not connected to the SIM component 124, a popup message pertaining to the missing SIM card may be displayed some time during or following the boot up process of the apparatus 100. In any regard, the display of the popup message may block performance of the testing process. That is, the testing application 214 (e.g., set of instructions) may not be able to continue while the popup message is displayed.

In apparatuses that run certain types of operating systems, the popup message displayed on the display 122 may be dismissed, e.g., removed, cleared, no longer displayed, etc., when the apparatus 100 enters into a lock mode, e.g., a sleep, a hibernation, a low-power, etc., mode, and emerges from the lock mode. According to examples, the apparatus 100 may be set to enter into the lock mode after a predetermined length of time following a certain event pertaining to the boot up of the apparatus 100. The certain event may be the start of the boot up process, the end of the boot up process, or some other event. In addition, the boot up process may be from a condition in which the apparatus 100 is turned off and/or from a condition in which the apparatus 100 is restarted. The predetermined length of time may be based on the length of time that it normally takes for the popup message to be displayed following boot up process. For instance, the predetermined length of time may be set to expire a short time, e.g., a few seconds, 1 minute, 2 minutes, or the like, after the popup message is normally displayed.

In some examples, a user may set the apparatus 100 to enter into the lock mode at the predetermined length of time from the certain event. In addition or in other examples, the testing application 214 may cause the apparatus 100 to enter into the lock mode at the predetermined length of time from the certain event. In any regard, the apparatus 100 may enter the lock mode following the popup message being displayed on the display 122.

The processor 102 may fetch, decode, and execute the instructions 114 to, while the apparatus 100 is in the lock mode, cause the apparatus 100 to emerge from the lock mode. That is, the processor 102 may execute the instructions 114 to cause the apparatus 100 to be withdrawn from the lock mode. In addition, as discussed above, the popup message may be dismissed from being displayed on the display 122 of the apparatus 100.

The processor 102 may fetch, decode, and execute the instructions 116 to continue execution of the testing process of the apparatus 100. That is, the processor 102 may continue to execute the testing application 214, e.g., the testing process of the apparatus 100, because the popup message has been dismissed. The processor 102 may continue to execute the testing application 214 until the testing process is completed and/or a user terminates the testing process.

According to examples, the processor 102 may also execute the set of instructions of the testing application 214 to prevent the apparatus from entering into the lock mode during execution of the testing process following emergence of the apparatus 100 from the lock mode. That is, the set of instructions may cause the processor 102 to prevent an additional popup message from being displayed and/or may cause an additional popup message that has been displayed to be dismissed. Thus, for instance, the processor 102 may dismiss another popup message that is displayed on the display 122 while the testing process is being executed.

The processor 102 may further retrieve another testing application from the computing device 210. For instance, the processor 102 may retrieve another testing application from the computing device following conclusion of the execution of the testing process corresponding to the testing application 214. The processor 102 may automatically retrieve the other testing application from the computing device 210 following termination of the testing application 214. In addition, the processor 102 may initiate execution of the other retrieved testing application and may dismiss a popup message in response to the popup message being displayed such that the other retrieved testing application may be executed on the apparatus 100.

Figure 4:
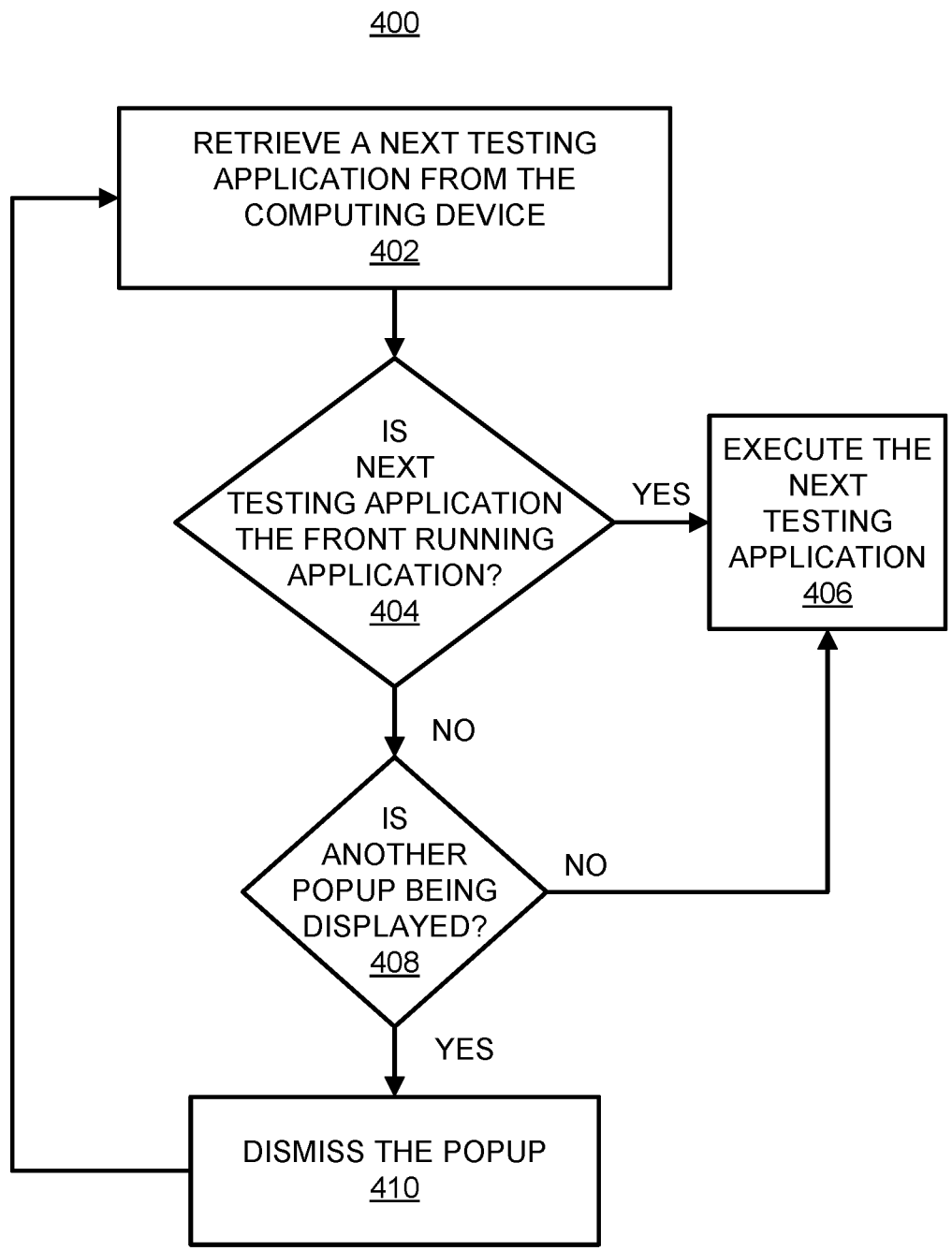

Various manners in which the processor 102 may be implemented are discussed in greater detail with respect to the methods 300 and 400 depicted in FIGS. 3 and 4. Particularly, FIGS. 3 and 4, respectively, depict example methods 300, 400 for executing a testing process of an apparatus 100. It should be apparent to those of ordinary skill in the art that the methods 300, 400 may represent generalized illustrations and that other operations may be added or existing operations may be removed, modified, or rearranged without departing from scopes of the methods 300, 400.

The descriptions of the methods 300, 400 are made with reference to the apparatus 100 and the testing system 200 illustrated in FIGS. 1-2 for purposes of illustration. It should be understood that apparatuses and/or printing systems having other configurations may be implemented to perform the methods 300 and/or 400 without departing from scopes of the methods 300, 400.

At block 302, the processor 102 may download, from a computing device 210, a set of instructions (e.g., of the testing application 214) for testing an operation of a mobile device (which may be equivalent to the apparatus 100). As discussed herein, the processor 102 may automatically download the set of instructions in response to the apparatus 100 being connected to the computing device 210. The processor 102 may also download the set of instructions following boot up of the mobile device 100 and while the mobile device 100 is connected to the computing device 210.

At block 304, the processor 102 may execute the downloaded set of instructions to test the operation of the mobile device 100. The processor 102 may automatically execute the downloaded set of instructions, e.g., as part of a plug and play operation with the computing device 210. During execution of the set of instructions, a popup message may be displayed and the mobile device 100 may enter into a lock mode. As discussed herein, in instances in which a SIM card is not installed or connected to a SIM component 124 in the mobile device 100, a popup message regarding the SIM card may automatically be displayed on the display 122. For instance, the operating system running on the apparatus 100 may cause such a popup message to be displayed when the operating system determines that a SIM card is not connected to the SIM component 124. In addition, as discussed herein, the processor 102 may cause the mobile device 100 to enter into the lock mode after a predetermined length of time following a certain event pertaining to a boot up process of the mobile device 100 occurring.

At block 306, while the mobile device 100 is in the lock mode, the processor 102 may cause the mobile device 100 to emerge from the lock mode. As discussed herein, emergence from the lock mode may automatically cause the displayed popup message to be dismissed. In addition, at block 308, the processor 102 may continue execution of the set of instructions to test the operation of the mobile device following dismissal of the displayed popup message. In some examples, the continued execution of the set of instructions may prevent the mobile device 100 from entering into the lock mode again during the continued execution of the set of instructions. In addition, or alternatively, the continued execution of the set of instructions may cause the processor 102 to dismiss another popup message that may be displayed on the display 122 of the mobile device 100 during the continued execution of the set of instructions.

Reference is now made to FIG. 4, which shows operations that the processor 102 may execute during or after block 308 shown in FIG. 3. That is, for instance, the processor 102 may retrieve and execute a next testing application (or equivalently, a second testing application) to further test the mobile device 100 following execution of the testing application 214.

As shown in FIG. 4, at block 402, the processor 102 may retrieve a next testing application from the computing device 210. That is, for instance, the computing device 210 may have stored thereon or elsewhere, a plurality of testing applications that the processor 102 may execute to test the mobile device 100. The processor 102 may retrieve the testing applications according to a predefined order, for instance, as the processor 102 completes execution of each of previously retrieved testing applications.

At block 404, the processor 102 may determine whether the retrieved next testing application is a front running application of the mobile device 100 or if an operating system of the mobile device 100 is the front running application. The front running application of the apparatus 100 may be the application that is currently displayed on the display 122. That is, for instance, when the operating system of the mobile device 100 is the front running application, the operating system may cause system alerts, such as battery low, update the mobile device 100, etc., to be displayed on the display 122. In these instances, the processor 102 may not be able to execute the retrieved testing application. However, in instances in which the retrieved next testing application is the front running application, the processor 102 may execute the next testing application as indicated at block 406.

However, based on a determination that the next testing application is not the front running application on the mobile device 100, at block 408, the processor may determine whether another popup is currently being displayed on the display 122. Based on a determination that another popup is not currently being displayed, the processor 102 may execute the next testing application as indicated at block 406. However, based on a determination that another popup is currently being displayed, at block 410, the processor 102 may dismiss the popup. In addition, the processor 102 may retrieve the next testing application from the computing device 210 again and may execute the next testing application based on the next testing application being the front running application of the apparatus 100.

Some or all of the operations set forth in the methods 300 and 400 may be included as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Turning now to FIG. 5, there is shown a block diagram of a non-transitory computer readable medium 500 that may have stored thereon machine readable instructions for testing an operation of an apparatus. It should be understood that the computer readable medium 500 depicted in FIG. 5 may include additional instructions and that some of the instructions described herein may be removed and/or modified without departing from the scope of the computer readable medium 500 disclosed herein. The computer readable medium 500 may be a non-transitory computer readable medium. The term "non-transitory" does not encompass transitory propagating signals.

The computer readable medium 500 may have stored thereon machine readable instructions 502-508 that a processor, such as the processor 102 depicted in FIGS. 1 and 2, may execute. The computer readable medium 500 may be an electronic, magnetic, optical, or other physical storage device that contains or stores executable instructions. The computer readable medium 500 may be, for example, Random Access memory (RAM), an Electrically Erasable Programmable Read-Only Memory (EEPROM), a storage device, an optical disc, and the like.

The processor may fetch, decode, and execute the instructions 502 to download the machine readable instructions (which may be a set of instructions corresponding to the testing application 214) from the computing device 210. As discussed herein, the apparatus 100 may have a subscriber identify module (SIM) component 124 to which a SIM card is to be connected, in which a SIM card is not connected to the SIM component. The processor may fetch, decode, and execute the instructions 504 to test the operation of the apparatus 100 following a boot up of the apparatus 100, in which a popup message pertaining to the SIM card not being connected to the SIM component 124 may be displayed following the boot up of the apparatus. For instance, the operating system of the apparatus 100 may cause the popup message to be displayed in response to a determination that the SIM card is not connected to the SIM component 124. In addition, the apparatus 100 may enter into a lock mode following display of the popup message as also discussed herein.

The processor may fetch, decode, and execute the instructions 506 to, while the apparatus 100 is in the lock mode, cause the apparatus 100 to emerge from the lock mode, in which emergence from the lock mode causes the displayed popup message to be dismissed. Moreover, the processor may fetch, decode, and execute the instructions 508 to continue to test the operation of the apparatus 100 following dismissal of the displayed popup message. The instructions may further cause the processor to prevent the apparatus 100 from entering into the lock mode again during the test of the operation of the apparatus 100. The instructions may still further cause the processor to dismiss another popup message displayed on the apparatus 100 during the test of the operation of the apparatus 100.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A mobile device comprising:
   a processor; and
   a non-transitory computer readable medium on which is stored instructions that, when executed by the processor, cause the processor to:
   boot up the mobile device;
   initiate a testing process of the mobile device following the boot up of the mobile device;
   start a predetermined period of time following the boot up of the mobile device, wherein the predetermined period of time is greater than a length of time for an error popup message to be displayed on the mobile device after the testing process has initiated;
   cause the error popup message to be displayed on the mobile device after the testing process of the mobile device has initiated and before the predetermined period of time expires, wherein the display of the error popup message blocks the testing process and causes the mobile device to enter into a lock mode;
   in response to an expiration of the predetermined period of time while the mobile device is in the lock mode and the testing process of the mobile device is blocked, cause the mobile device to emerge from the lock mode, wherein the emergence of the mobile device from the lock mode causes the error popup message to be dismissed from being displayed on the mobile device; and
   continue the testing process of the mobile device following the error popup message being dismissed from being displayed on the mobile device.

2. The mobile device of claim 1, wherein the predetermined period of time is set to start following an end of the boot up of the mobile device.

3. The mobile device of claim 1, wherein the instructions cause the processor to prevent the mobile device from entering into the lock mode again during the testing process of the mobile device following the emergence of the mobile device from the lock mode.

4. The mobile device of claim 1, wherein the instructions cause the processor to:

automatically download a testing application from a computing device to the mobile device following a connection of the mobile device to the computing device; and automatically execute the downloaded testing application to initiate the testing process of the mobile device following the boot up of the mobile device.

5. The mobile device of claim 4, wherein the instructions cause the processor to retrieve a second testing application after the execution of the downloaded testing application.

6. The mobile device of claim 5, wherein the instructions cause the processor to:

following the second testing application being retrieved, determine whether the second testing application is a front running application of the mobile device or if an operating system of the mobile device is the front running application; and based on a determination that the second testing application is the front running application of the mobile device, execute the second testing application.

7. The mobile device of claim 6, wherein the instructions cause the processor to:

based on a determination that the operating system is the front running application of the mobile device, determine whether another popup message is currently being displayed;

based on a determination that another popup message is currently not being displayed, execute the second testing application; and based on a determination that another popup message is currently being displayed, dismiss the another popup message.

8. The mobile device of claim 1, wherein the instructions cause the processor to:

dismiss another popup message while the testing process is being executed.

9. The mobile device of claim 1, wherein the mobile device includes a component to which a subscriber identify module (SIM) card is to be connected, wherein the mobile device does not include a SIM card connected to the component, and wherein the error popup message displayed on the mobile device indicates that the SIM card is not being connected to the component.

10. A method comprising:

downloading, by a processor, from a computing device to a mobile device, a test application for testing an operation of the mobile device;

initiating, by the processor, an execution of the test application following a boot up of the mobile device;

starting, by the processor, a predetermined period of time following the boot up of the mobile device, wherein the predetermined period of time is greater than a length of time for an error popup message to be displayed on the mobile device after the execution of the test application has initiated;

causing, by the processor, the error popup message to be displayed on the mobile device after the execution of the test application has initiated and before the predetermined period of time expires, wherein the display of the error popup message causes the mobile device to enter into a lock mode and blocks the execution of the test application;

in response to an expiration of the predetermined period of time while the mobile device is in the lock mode and the execution of the test application is blocked, causing, by the processor, the mobile device to emerge from the lock mode, wherein the emergence of the mobile device from the lock mode automatically causes the display of the error popup message to be dismissed; and continuing the execution, by the processor, of the test application following the dismissal of the display of the error popup message.

11. The method of claim 10, wherein downloading the test application comprises automatically downloading the test application from the computing device to the mobile device following a connection of the mobile device to the computing device and following the boot up of the mobile device.

12. The method of claim 10, wherein the predetermined period of time is set to start following an end of the boot up of the mobile device.

13. The method of claim 12, further comprising:

preventing the mobile device from entering into the lock mode again after the execution of the test application is continued.

14. The method of claim 10, wherein the mobile device includes a component to which a subscriber identify module (SIM) card is to be connected, wherein the mobile device does not include the SIM card connected to the component, and wherein the error popup message displayed on the mobile device indicates that the SIM card is not being connected to the component.

15. The method of claim 10, further comprising:

automatically dismissing another popup message from being displayed on the mobile device after continuing the execution of the test application.

16. The method of claim 10, further comprising:

retrieving a next testing application;

determining whether the next testing application is a front running application of the mobile device or if an operating system of the mobile device is the front running application of the mobile device; and based on a determination that the next testing application is the front running application of the mobile device, executing the next testing application.

17. The method of claim 16, further comprising:

based on a determination that the operating system is the front running application of the mobile device, determining whether another popup message is currently being displayed;

based on a determination that another popup message is currently not being displayed, executing the next testing application; and based on a determination that another popup message is currently being displayed, dismissing the another popup message.

18. A non-transitory computer readable medium on which is stored machine readable instructions that, when executed by a processor, cause the processor to:

download a testing application to test an operation of a mobile device, the mobile device having a subscriber identify module (SIM) component to which a SIM card is to be connected, wherein the SIM card is not connected to the SIM component;

initiate an execution of the testing application to test the operation of the mobile device following a boot up of the mobile device;

start a predetermined period of time following the boot up of the mobile device, wherein the predetermined period of time is greater than a length of time for an error popup message to be displayed on the mobile device after the execution of the testing application has initiated;

cause the error popup message to be displayed on the mobile device after the execution of the testing application has initiated and before the predetermined period of time expires, wherein the error popup message indicates that the SIM card is not being connected to the SIM component, and wherein the display of the error popup message causes the mobile device to enter into a lock mode and the execution of the testing application to be blocked;

in response to an expiration of the predetermined period of time while the mobile device is in the lock mode and the execution of the testing application is blocked, cause the mobile device to emerge from the lock mode, wherein the emergence of the mobile device from the lock mode causes the display of the error popup message to be dismissed; and continue the execution of the testing application to test the operation of the mobile device following the dismissal of the display of the error popup message.

19. The non-transitory computer readable medium of claim 18, wherein the instructions cause the processor to:
prevent the mobile device from entering into the lock mode again after the execution of the testing application is continued.

20. The non-transitory computer readable medium of claim 18, wherein the instructions cause the processor to:
dismiss another popup message from being displayed on the mobile device after the execution of the testing application is continued.

* * * * *